Patented Sept. 28, 1943

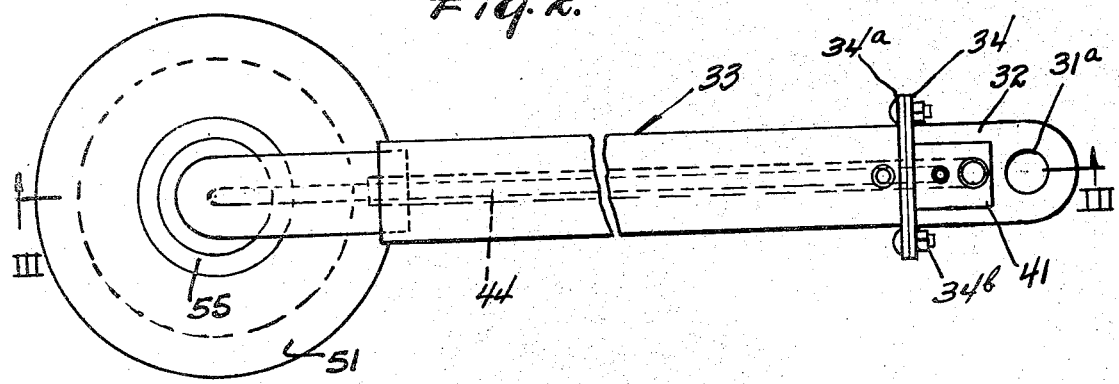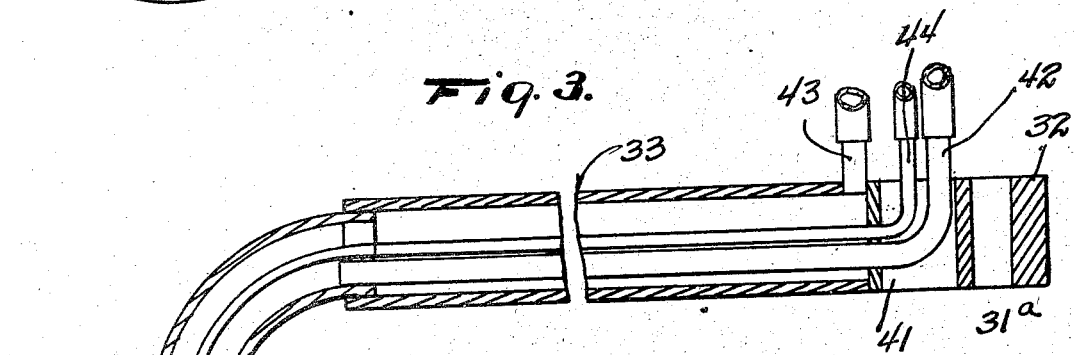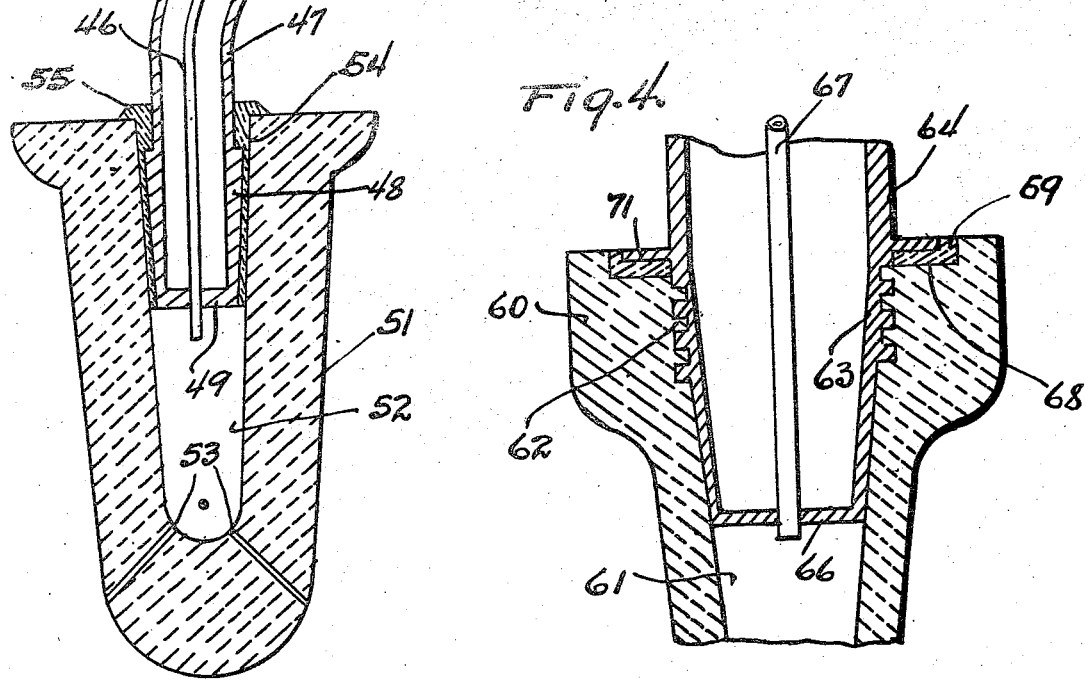

2,330,343

UNITED STATES PATENT OFFICE 2,330,343

APPARATUS FOR FINING MOLTEN GLASS

John G. Frantz, Pittsburgh, Pa., assignor to Pittsburgh Plate Glass Company, Allegheny County, Pa., a corporation of Pennsylvania Application March 12, 1942, Serial No. 434,353

1 Claim. (Cl. 49—14)

The present invention relates to apparatus for introducing gases into molten glass for purposes of removing seed therefrom, and it has particular relation to the provision of an improved stirring head for use in the bubbling operation involved in the elimination of seed from molten glass.

An object of the invention is to provide a simple, convenient and efficient joint between a refractory stirring head and the tubing carrying the head.

This and other objects of the invention will be apparent from consideration of the following specification and the claim.

In the manufacture of glass, lime, soda-ash, sodium sulfate, silica and other ingredients, customarily are mixed together and then heated in a refractory pot, tank, or other receptacle in order to melt them down into a homogeneous mass. In the heating operation, large volumes of gases are formed, most of which escape quickly to the surface, but some of which are retained in the relatively viscous molten glass in the form of small bubbles termed "seed." In order to effect removal of the seed, it has heretofore been customary to introduce into the glass carbonaceous blocking agents, such as charcoal, potatoes or other material designed to evolve large volumes of gas in the form of bubbles of such size as to be able to escape through the viscous liquid to the surface. The large bubbles, in their progress upwardly through the molten glass, tended to collect the smaller ones and thus assist in their removal. This operation was not entirely satisfactory because most carbonaceous material when introduced into the molten glass evolved gases very quickly, thus inducing violent bubbling or boiling likely to cause the glass to spill. Moreover, the bubbling action usually was greatly localized and terminated within a short time so that "blocking" was incomplete.

In Patent No. 2,261,034, of October 28, 1941, issued to K. B. McAlpine, it is proposed to perform the fining or blocking operation in molten glass with a stirring or agitating device provided with a hollow but refractory head, through which fining gases could be bubbled at a steady and uniform rate for such period as might be required to effect thorough removal of the gas bubbles. Heretofore, considerable difficulty has been encountered in the operation of this apparatus, because of difficulty of obtaining a sufficiently gas-tight joint or union between the conduits and the stirring head upon the conduits. The stirring head of course was subject to substantial fluctuations of temperature and, moreover, the pressure in the joint, due to differences of thermal expansion of the parts, could not be very great without producing rupture of the stirring head.

In accordance with the provisions of the present invention it is proposed to overcome the foregoing difficulties by providing a stirring head of refractory material similar to the one disclosed in the McAlpine patent, but being provided at the upper extremity of the bore through which the conduits are introduced with a groove or rabbet of such size as to admit of the collection of a small sealing annulus of glass about the conduit. The glass in the seal is sufficiently cooled by reason of gases in the conduit or by other factors to provide an effective seal at this point.

Reference may now be had to the accompanying drawings in which like numerals refer to like parts throughout, and in which Fig. 1 is a fragmentary view illustrating a portion of a tank for molten glass and a suitable stirring apparatus for use in the practice of the invention;

Fig. 2 is a plan view of a stirring arm and the head therefor;

Fig. 3 is a sectional view taken substantially upon the line III—III of Fig. 2;

Fig. 4 is a fragmentary sectional view of an additional form of the invention.

Figure 1:
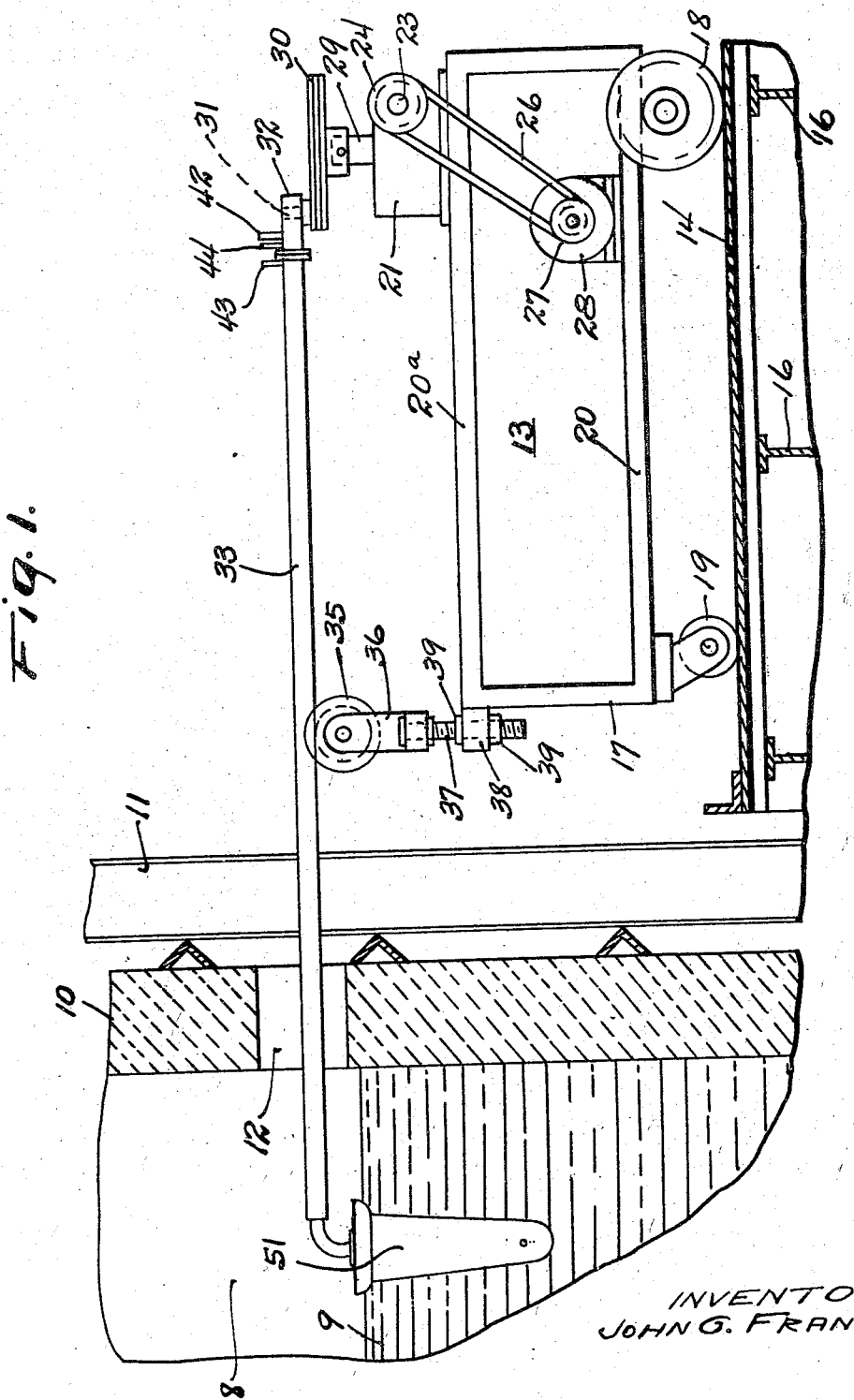

The apparatus as shown includes a pot, tank or other container 8 for molten glass, indicated as a pool at 9. The apparatus as shown includes a side wall 10, reinforced by frame elements 11 and having an opening 12 formed in it, at a point just above the surface of the molten glass and being designed for insertion of the arm portion of an agitating apparatus, indicated generally at 13. This apparatus is supported upon a platform 14 upon a framework 16 and includes a body 17 with rear wheels 18, caster-like front wheels 19. The body comprises a lower deck 20 and upper deck 20a, the latter of which carries a speed-reducing mechanism 21, actuated by the horizontal shaft 23. A drive pulley or sprocket 24 is secured to the shaft and has a belt or chain 26 trained thereabout, said belt or chain being trained about pulley 27, of motor 28, upon the deck 20.

Drive-shaft 29 projects vertically from the speed-reducing mechanism and is provided upon its upper extremity with disk 30, having adjacent to its upper periphery a crank-pin 31. The pin, also, is journaled in a bearing 31a in a block 32, of a hollow agitator arm 33. The block and the arm, at contiguous ends, are respectively provided with flanges 34 and 34a, which are held securely together by means of suitable bolts 34b.

The arm 33, as shown in Fig. 1, projects through the opening 12 into the pot or tank 8 and intermediate of its length it is supported for combined rotation and oscillating movement upon a pulley 35, which pulley is journaled in a fork 36. The fork is, also, journaled upon a pintle 37 and the pintle extends through an opening in a bracket 38 upon the forward end of the carriage 13, and may be secured adjustably in position by means of nuts 39, threaded thereupon.

The arm is tubular in construction, as best shown in Fig. 3, and at its rear extremity is closed by the block 32. A slot 41 is also formed in the block 32 to receive conduit 42 projecting forwardly into the tubular portion of the arm or rod and carrying cooling fluid for reducing the temperature of the arm to forward end of the latter. A third conduit 43 is connected to the rear extremity of the arm and provides a discharge for the cooling fluid. Gases for fining the molten glass are conveyed through conduit 44 within the arm 33. At its forward end the conduit is provided with a downwardly bent portion 46, enclosed by a similarly curved tube 47, which is plugged into the forward extremity of the arm. Tube 47 terminates in a frusto-conical plug-like portion 48, having its lower extremity closed, as indicated at 49, in such manner as to leave the tip portion of the tube 46 projecting a short distance.

Stirrer head 51, of fire-clay or other refractory material, is formed with a bore 52 of such shape as approximately to fit the plug 48. A series of small holes or openings 53 are formed in the head, through which gases escape into the molten glass. Preferably these openings are disposed at slightly different elevations, thus making it possible to obtain more uniform distribution of the gases in the molten glass in the pot or container. It is to be observed that a substantial groove or rabbet 54 is formed about the upper extremity of the bore 52 and this space is to be filled with glass 55, easily introduced, merely by dipping the assembly into a bath of molten glass and allowing the molten glass to run into the space. Of course the space must be substantial in order to allow entrance of the molten material, but the space between the surface of the plug portion 48 and the inner wall of the bore should not be so great as to permit the molten glass to flow down into the space below the lower extremity of the plug.

It will be apparent that when the flow of cooling fluid is initiated in the arm 33 that the plug 48 will be cooled to a certain extent and the glass in the space 54 will be sufficiently hardened to insure that the head 51 will be carried permanently in place. The glass will also provide an efficient seal against the escape of gases about the plug 48.

The operation of the apparatus is substantially self-evident from the foregoing description. The head 51 is merely inserted upon the plug 48 and the assembly dipped in molten glass, for example, by inserting it through the opening 12 in the wall of the glass chamber. Then with the arm 33 in place upon pulley or roller 35 and disk 30 and with the conduits 42, 43 and 44 suitably connected up with sources of cooling fluid and gas, the motor 28 is operated, thus causing the head 51 to be moved about in the molten glass in closed circles or other closed paths. The glass is simultaneously agitated and subjected to a continuous and uniform blocking by the escape of gases, which are relatively widely distributed throughout the glass bath. The blocking and agitating operations are continued until most of the seed are removed from the glass, after which the apparatus may be withdrawn and used in other pots or containers, as may be desired.

In the form of the invention shown in Fig. 4 a stirring head 60 of refractory material is formed with a central bore 61, the upper portion 62 of which is threaded to receive the plug-like metallic tip 63 of a goose-neck member 64 functioning similarly to member 47. The plug is closed as indicated at 66 and a tube 67 for gases passes through the closure into bore 61. The upper extremity of the head is rabbeted or countersunk as indicated at 68 to receive sealing glass 69. The head is also provided with a fin or collar 71, which is embedded and promotes conduction of heat from the glass.

The form of the invention herein shown and described is to be considered merely by way of example. It will be apparent to those skilled in the art that numerous modifications may be made therein without departure from the spirit of the invention or the scope of the claim.

What I claim is:

An apparatus for fining glass comprising a stirring head of refractory material adapted to be inserted into molten glass and being formed with a central bore communicating with perforations in the stirring head through which gases are allowed to flow into the glass, a hollow stirring arm having a downwardly projecting portion fitting within said bore and being closed at its lower end to retain cooling fluid from emission into the bore, a conduit for fining gases extending into the bore, the upper portion of the bore being of sufficiently greater diameter than the downwardly projecting portion therein to provide a groove within the bore into which molten glass will flow when the head is dipped into molten glass, the groove being filled with glass providing a seal between the stirring head and the offset portion, the glass in the groove being cooled by the cooling fluid in said arm, at least partially to solidify it during stirring operations and means to oscillate the arm when the stirring head is dipped into molten glass.

JOHN G. FRANTZ.